US011122789B2

(12) United States Patent
Thorne

(10) Patent No.: US 11,122,789 B2
(45) Date of Patent: Sep. 21, 2021

(54) TERMITE PREFERRED RESOURCE COMPOSITIONS AND METHODS

(71) Applicant: SYNGENTA PARTICIPATIONS AG, Basel (CH)

(72) Inventor: Barbara Thorne, Vero Beach, FL (US)

(73) Assignee: Syngenta Participations AG, Basel (CH)

( * ) Notice: Subject to any disclaimer, the term of this patent is extended or adjusted under 35 U.S.C. 154(b) by 613 days.

(21) Appl. No.: 15/561,099

(22) PCT Filed: Mar. 24, 2016

(86) PCT No.: PCT/US2016/023961
§ 371 (c)(1),
(2) Date: Sep. 25, 2017

(87) PCT Pub. No.: WO2016/154407
PCT Pub. Date: Sep. 29, 2016

(65) Prior Publication Data
US 2018/0116197 A1     May 3, 2018

Related U.S. Application Data

(60) Provisional application No. 62/137,889, filed on Mar. 25, 2015.

(51) Int. Cl.
| | |
|---|---|
| *A01M 1/20* | (2006.01) |
| *E04B 1/72* | (2006.01) |
| *A01M 1/02* | (2006.01) |
| *A01M 1/24* | (2006.01) |
| *A01N 65/00* | (2009.01) |

(52) U.S. Cl.
CPC .......... *A01M 1/2011* (2013.01); *A01M 1/026* (2013.01); *A01M 1/24* (2013.01); *E04B 1/72* (2013.01); *A01M 2200/011* (2013.01); *A01N 65/00* (2013.01)

(58) Field of Classification Search
CPC .. A01M 1/026; A01M 1/2005; A01M 1/2011; A01M 2200/011
See application file for complete search history.

(56) References Cited

U.S. PATENT DOCUMENTS

| | | | | |
|---|---|---|---|---|
| 6,370,812 | B1* | 4/2002 | Burns | A01N 25/006 43/124 |
| 6,852,327 | B1* | 2/2005 | Esteban Duran | A01N 25/006 424/405 |
| 2006/0265944 | A1* | 11/2006 | Meier | A01M 1/2011 43/131 |
| 2008/0091447 | A1 | 4/2008 | Gilmore | |

FOREIGN PATENT DOCUMENTS

| | | |
|---|---|---|
| JP | 2005046076 A | 2/2005 |
| WO | 2016009279 A2 | 1/2016 |

OTHER PUBLICATIONS

International Search Report for International Application No. PCT/US2016/023961 dated Jun. 10, 2016.

\* cited by examiner

*Primary Examiner* — Richard G Davis
(74) *Attorney, Agent, or Firm* — James Cueva

(57) ABSTRACT

The present invention relates to termite preferred resource compositions and methods. In embodiments, the present invention is directed to termite preferred resource compositions including materials from a *Sabal* palm tree material (*Sabalpalmetto*; Family Arecaceae) and a pesticide toxic to one or more species of termites. In additional embodiment's, the present invention is directed to a method of creating a termite assurance program to limit termite damage to a structure including the steps of providing an initial investigation of termite detection, damage, or activity for a structure; placing a termite station comprising a housing, at least one entry point in the housing allowing for ingress and egress of a termite, and materials from a *Sabal* palm tree contained within the housing in an area proximate the structure, and inspecting the termite station for live termites or evidence of termite activity after it is placed.

6 Claims, No Drawings

TERMITE PREFERRED RESOURCE COMPOSITIONS AND METHODS

RELATED APPLICATION INFORMATION

This application is a 371 of International Application No. PCT/US2016/023961, filed 24 Mar. 2016, which claims priority to 62/137,889, filed 25 Mar. 2015, the contents of which are incorporated herein by reference herein.

FIELD OF TECHNOLOGY

The present invention relates to termite preferred resource materials, compositions and methods for use. More specifically, the present invention relates to termite preferred resource materials, compositions and methods for use comprising palm trees.

BACKGROUND

Termites, known for their destructive activity, are responsible for approximately one billion dollars in damage to buildings and agriculture each year. In structures, the onset of the termite activity is generally difficult to detect and control because destruction occurs internally within wooden elements and may provide limited external signs of damage until a termite infestation has caused significant destruction.

SUMMARY

In embodiments, the present invention is directed to termite preferred resource compositions including materials from a *Sabal* palm tree material (*Sabal palmetto*; Family Arecaceae) and a pesticide toxic to one or more species of termites.

In additional embodiments, the present invention is directed to a method of creating a termite assurance program to limit termite damage to a structure including the steps of providing an initial investigation of termite detection, damage, or activity for a structure; placing a termite station comprising a housing, at least one entry point in the housing allowing for ingress and egress of a termite, and materials from a *Sabal* palm tree contained within the housing in an area proximate the structure, and inspecting the termite station for live termites or evidence of termite activity after it is placed.

In further embodiments, the present invention is directed to a termite station including materials from a *Sabal* palm tree placed within a station including a housing where the *Sabal* palm tree material is contained, and at least one entry point in said housing allowing for ingress and egress of termites.

The above summary is intended to summarize certain embodiments of the present disclosure. Systems, methods and compositions will be set forth in more detail, along with examples demonstrating efficacy, in the figures and detailed description below. It will be apparent, however, that the detailed description is not intended to limit the present invention, the scope of which should be properly determined by the appended claims.

DETAILED DESCRIPTION

As indicated above, the present invention relates to termite preferred resource materials, compositions and methods of use. By offering food(s) that capture termites' attention in preference to or in addition to other available cellulose resources, with these food(s) presented with or without cellulose substrate(s) and/or moisture, the materials, compositions and methods of the present invention may aid in creating an appealing resource and therefore activity site for termites. The materials, compositions and methods of the present invention may thereby capture the attention of termite(s), stimulate them to feed, incite them to recruit other colony-mates, and/or sustain activity at the source of said materials or compositions. Accordingly, the materials, compositions and methods of the present invention may also include opportunities to deliver pesticides such as insecticides or termiticides via bait, liquid or other treatment either before or after termite activity has taken place at the preferred resource materials or compositions of the present invention. The methods of the present invention may also include revealing previously hidden termite activity by focusing termite attention at known locations that can be monitored during periodic inspections. Such methods may also lead to certain assurance programs for monitoring and limiting termite damage to certain structures utilizing the compositions and methods disclosed.

The present invention may be utilized in connection with any termites including, but not limited to, the Family Mastotermitidae, including *Mastotermes darwiniensis*; the Family Archotermopsidae, including the species *Zootermopsis angusticollis, Z nevadensis*; the Family Hodotermitidae, including the genera *Anacanthotermes, Hodotermes, Microhodotermes*; the Family Kalotermitidae, including the genera *Bifiditermes, Comatermes, Cryptotermes, Epicalotermes, Glyptotermes, Incisitermes, Kalotermes, Neotermes, Paraneotermes, Postelectrotermes, Rugitermes*, and the species *Cryptotermes brevis, C. cynocephalus, C, domesticus, C. dudleyi, C. havilandi, Incisitermes minor, I. schwarzi, I. snyderi, Kalotermes approximatus, K. flavicollis, Marginitermes hubbardi, Paraneotermes simplicomis, Tauritermes vitulus*; the Family Rhinotermitidae including the genera *Coptotermes, Heterotermes, Prorhinotermes, Reticulitermes*, and the species *Coptotermes acinaciformis, C. curvignathus, C. formosanus, C. gestroi, C. havilandi, C. kalshoveni, C. sepangensis, C. travians, Heterotermes aureus, H. cardini, H. convexinotatus, H. indicola, H. tenuis, Prorhinotermes simplex, Reticulitermes flavipes, R. hageni, R. hesperus, R. lucifugus, R. malletei, R. speratus, R. tibialis, R. virginicus*; the Family Termitidae, including the genera *Ancistrotermes, Capritermes, Cornitermes, Macrotermes, Microcerotermes, Microtermes, Nasutitermes, Odontotermes, Pericapritermes, Procornitermes, Pseudacanthotermes, Syntermes, Termes*, and the species *Amitermes evuncifer, A. minimus, A. snyderi, A. wheeleri, Nasutitermes acajutlae, N. corniger, N. ephratae, N. exitiosus, G. tubiformans, Gnathamitermes perplexus*.

Embodiments of the present invention include materials from the botanical family Arecaceae, often referred to as palm trees. In certain embodiments, the present invention may include materials from the *Sabal* palm tree, which may also be known as the Floridian cabbage palm, the Carolina palm or by the scientific name, *Sabal palmetto*. In embodiments of the invention, materials from the *Sabal* palm tree may include portions, isolates, derivatives, extracts, suitable compost stages, or others of the *Sabal* palm tree. In embodiments of the invention, any part of the *Sabal* palm, either dead or alive, may be utilized. For example, embodiments of the invention may contain the stem, including all orders of branches, the stalk and the bark or bract sheeting, leaves, petioles, flowers, fruits, and others. In additional embodiments of the invention, portions of the inflorescence rachis (any or all structures of the flowering/fruiting stalk and/or its branches) may be utilized. In additional embodiments, the materials may also include, among others, tissues, oils, amino acids, proteins, minerals, sugars, fatty acids, textures or combinations thereof from the *Sabal* palm tree.

Although the present invention has been described in connection with the *Sabal* palm tree, the embodiments of the present invention may also include materials from any tree within the botanical family Arecaceae, including the various genera associated with such. Such genera may include, but is not limited to, *Archontophoenix, Areca, Bactris, Beccariophoenix, Bismarckia, Borassus, Calamus, Cocos, Copernicia, Corypha, Elaeis, Euterpe, Hypaene, Jubaea, Latania, Livistona, Mauritia, Metroxylon, Nypa, Parajubaea, Phoenix, Phoenix sylvestris, Raphia, Roystonea, Sabal, Salacca, Syagrus, Trachycarpus, Veitchia, Washingtonia*. In addition, the present invention may include mixtures of two or more different types (species or varieties) of palm trees.

The materials utilized in the present invention from the botanical family Arecaceae may be presented in any form to increase the activities of the materials. In embodiments of the invention, the compositions and methods may utilize the materials in their natural form, cut form, sawdust, chipped, ground or milled (into filings, pellets, or others), wood flour, formed into various solid shapes, and in a composite form with various other forms, among others. For example, if the materials are presented in cut form, they may be cut in pieces of varying sizes, from about 0.5 mm to about 200 mm in length, where they may have a thickness of about 0.5 mm about 50 mm. In addition, if the materials are in a sawdust form, the sawdust may include mixed particle sizes or sieved to a fairly uniform size.

The materials and compositions of the present invention may be prepared in any form. For example, suitable forms may include, but are not limited to emulsifiable concentrates, suspension concentrates, directly sprayable or dilutable solutions, coatable pastes, dilute emulsions, wettable powders, soluble powders, dispersible powders, embedded particles, microparticle, microemulsion, wettable powders, dusts, granules, pellets, pressurized tablets or other configurations, aerosols or encapsulations in polymer substances, the type of formulation being chosen in accordance with the intended objectives and prevailing circumstances. Such compositions used against wood pests are, for example, of the same kind as those described in EP-A-736 252.

Formulation adjuvants that may be used in compositions of the present invention include, but are not limited to, solid carriers, solvents, stabilisers, "slow release" adjuvants, colorants and optionally surface-active substances (surfactants). Suitable carriers and adjuvants include any substances customarily used in plant protection compositions. Suitable adjuvants, such as solvents, solid carriers, surface-active compounds, non-ionic surfactants, cationic surfactants, anionic surfactants and other adjuvants in the compositions used according to the invention include, for example, the same substances as those described in EP-A-736 252, page 7, line 51 to page 8, line 39, which are included in the present application by reference.

The materials and compositions to be used according to the invention may be prepared in a known matter, in the absence of adjuvants, for example by milling, grinding, sawing, chipping (as in a mulcher), and/or sieving, for example to a specific particle size, or compressing the palm material, or in the presence of at least one adjuvant, for example by intimately mixing and/or grinding the palm material with the adjuvant(s). The invention relates also to those processes for the preparation of the compositions according to the invention and to the use of the palm material in the preparation of those compositions.

The compositions comprise 0.1 to 99%, or 0.1 to 95%, of the palm material, and 1 to 99.9%, or 5 to 99.9%, of—at least—one solid or liquid adjuvant, it generally being possible for 0 to 25%, or 0.1 to 20%, of the compositions to be surfactants (in each case percentages are by weight). In some embodiments, the palm material may include 100% of the material utilized in the methods of the present invention.

The activity of the materials and compositions according to the invention may be substantially broadened and adapted to prevailing circumstances by the addition of one or more pesticides, for example, insecticidal, acaricidal and/or fungicidal, active ingredients. Examples of suitable additional insecticidal and acaricidal active ingredients include representatives of the following classes of compounds: organophosphorus compounds, nitrophenols and derivatives, formamidines, nitroenamine derivatives, nitro- and cyanoguanidine derivatives, ureas, benzoylureas, carbamates, pyrethroids, chlorinated hydrocarbons and *Bacillus thuringiensis* preparations. Mixing partners may be, for example, azamethiphos; chlorantraniliprole, chlorfenvinphos; cyantraniliprole, cypermethrin, cypermethrin high-cis; cyromazine; diafenthiuron; diazinon; dichlorvos; dicrotophos; dicyclanil; fenoxycarb; fluazuron; furathiocarb; indoxacarb, isazofos; jodfenphos; kinoprene; lufenuron; methacriphos; methidathion; monocrotophos; phosphamidon; profenofos; diofenolan; a substance obtainable from the *Bacillus thuringiensis* strain GC91 or from NCTC11821; pymetrozine; bromopropylate; methoprene; disulfoton; quinalphos; taufluvalinate; thiocyclam; thiometon; aldicarb; azinphos-methyl; benfuracarb; bifenthrin; buprofezin; carbofuran; dibutylaminothio; cartap; chlorfluazuron; chlorpyrifos; cyfluthrin; lambda-cyhalothrin; alpha-cypermethrin; zeta-cypermethrin; deltamethrin; diflubenzuron; endosulfan; ethiofencarb; fenitrothion; fenobucarb; fenvalerate; formothion; methiocarb; heptenophos; imidacloprid; thiamethoxam; clothianidin; isoprocarb; methamidophos; methomyl; mevinphos; parathion; parathion-methyl; phosalone; pirimicarb; propoxur; teflubenzuron; terbufos; triazamate; fenobucarb; tebufenozide; fipronil; beta-cyfluthrin; silafluofen; fenpyroximate; pyridaben; fenazaquin; pyriproxyfen; pyrimidifen; nitenpyram; acetamiprid; avermectin $B_1$ (abamectin); emamectin; spinosad; RNAi tools and compositions (e.g. RNAi, miRNA, siRNA, shRNA) for control of insects and termites; a plant extract that is active against insects; a preparation comprising nematodes that are active against insects; biologics, hormones or pheromones, azadirachtin, *Bacillus* spec., *Beauveria* spec., codlemone, *Metarrhizium* spec., *Paecilomyces* spec., *thuringiensis* and *Verticillium* spec.; a preparation comprising fungi that are active against insects; a preparation comprising viruses that are active against insects; chlorfenapyr; acephate; acrinathrin; alanycarb; alphamethrin; amitraz; AZ 60541; azinphos A; azinphos M; azocyclotin; bendiocarb; bensultap; beta-cyfluthrin; BPMC; brofenprox; bromophos A; bufencarb; butocarboxim; butylpyridaben; cadusafos; carbaryl; carbophenothion; chloethocarb; chlorethoxyfos; chlormephos; cis-resmethrin; clocythrin; clofentezine; cyanophos; cycloprothrin; cyhexatin; demeton M; demeton S; demeton-S-methyl; dichlofenthion; dicliphos; diethion; dimethoate; dimethylvinphos; dioxathion; edifenphos; esfenvalerate; ethion; ethofenprox; ethoprophos; etrimphos; fenamiphos; fenbutatin oxide; fenothiocarb; fenpropathrin; fenpyrad; fenthion; fluazinam; flucycloxuron; flucythrinate; flufenoxuron; flufenprox; fonophos; fosthiazate; fubfenprox; HCH; hexaflumuron; hexythiazox; indoxacarb; iprobenfos; isofenphos; isoxathion; ivermectin; malathion; mecarbam; mesulfenphos; metaldehyde; metolcarb; milbemectin; moxidectin; naled; NC 184; omethoate; oxamyl; oxydemeton M; oxydeprofos; permethrin; phenthoate; phorate; phosmet; phoxim; pirimiphos M; pirimiphos E; promecarb; propaphos; prothiofos; prothoate; pyrachlophos; pyridaphenthion; pyresmethrin; pyrethrum; tebufenozide; salithion; sebufos; sulfotep; sulprofos; tebufenpyrad; tebupirimphos; tefluthrin; temephos; terbam; tetrachlorvinphos; thiacloprid; thiafenox; thiodicarb; thiofanox; thionazin; thuringiensin; tralomethrin; triarthene; triazophos; triazuron; trichlorfon; triflumuron; novaluron; fluzauron; chlorfluazuron; trimethacarb; vamidothion; xylylcarb; YI 5301/5302; zetamethrin; DPX-MP062-indoxacarb; methoxyfenozide; bifenazate; XMC (3,5-xylyl methylcarbamate) or the fungal pathogen *Metarhizium anisopliae*.

In additional embodiments of the invention, other beneficial materials may be added to provide the necessary attributes to the materials or composition. For example, a composition of the present invention may further contain various pheromones, vitamins, amino acids, minerals, protein supplements including bone meal, nutrients, and/or antimicrobial, biocidal, antifungal or preservation agents. In additional embodiments, soil and/or sand and/or moisture sources may be utilized to provide additional resources for termites. Further, polymers and/or plasticizers may be added to improve, among other things, the weatherability of the materials.

In additional embodiments, the materials and/or compositions of the present invention may be combined with indoxacarb, acetamiprid, bifenthrin, chlorantraniliprole, cyantraniliprole, chlorfenapyr, cypermethrin, esfenvalerate, fipronil, imidacloprid, permethrin, diflubenzuron, hexaflumuron, hydamethylnon, lufenuron, noviflumuron, novaluron, fluzauron, chlorfluazuron, triflumuron, thiamethoxam or mixtures thereof. In some embodiments, the *Sabal* palm tree materials may be mixed with indoxacarb, fipronil, diflubenzuron, hexaflumuron, hydamethylnon, lufenuron, noviflumuron, novaluron, fluzauron, chlorfluazuron, triflumuron, thiamethoxam or mixtures thereof.

Compositions of the present invention that include pesticides may comprise between about 0.01% and 99.9% of the palm material and between about 0.001% and about 99.9% of the pesticide, meaning either the active ingredient alone, or in a formulated composition. In additional embodiments, the ratio between the palm material and the pesticide may be from about 1:1 to about 1:0.001; from about 1:0.5 to about 1:0.001; from about 1:0.1 to about 1:0.001; from about 1:0.05 to about 1:0.001; and from about 1:0.01 to about 1:0.001.

In addition, the compositions for the present inventions may also include, or be included into, various readily acceptable termite cellulose sources. For example, the compositions may further include paper, cardboard, microcrystalline cellulose, pine, spruce, aspen, bagasse, and others.

In some embodiments, the materials and compositions of the present invention may be formed into a solid block, pellet, or other shape as desired by the user. Further, in additional embodiments, materials and compositions of the present invention may be packaged for, among other things, ease of transporting the materials and/or compositions to a desired location. For example, the materials and/or compositions of the present invention may be placed in a bag made of a material that is non-edible to termites, i.e. plastics, or other materials. In addition, in such embodiments, the bag may be vacuum-sealed or closed to aid in maintaining the moisture of the materials or compositions. Such bags may be malleable, so as to allow for the bag to conform to different surfaces.

In certain specific embodiments of the invention, such solid materials or bags, discussed above, may be used to detect or deliver toxicant to arboreal nest building termites, including the genus *Nasutitermes*, that includes the *Nasutitermes* corniger ("conehead termite"). In such embodiments, the solid materials or bags may be placed on tree trunks, branches, shrubs, fences, and other items. In order to detect or deliver toxicant to such arboreal nest building termites that may be out of reach, the materials or compositions of the present invention may be delivered via a gun that is powered by compressed air, similar to a paint-ball gun. In such embodiments, the materials and/or compositions of the present invention may be provided in plastic or other material that will destruct on contact with a tree or other location of the termite. In addition, paint or other colorant may be added to the material and/or composition of the present invention to provide the user an indication of whether a particular target has been hit.

Additionally, in embodiments of the present invention, termite cellulose sources, as mentioned above, may be added to the above-mentioned enclosed or vacuum-sealed non-edible bags. For example, within the enclosed bag, a user may place the materials or compositions of the present invention at a bottom portion of the bag, as well as a cellulose material at a top end. A user then may add openings to the bottom of the bag and place it at an area to determine termite activity, either above or below ground. If termites are present a user may determine the activity by their presence within the bag or by holes or other bites to the cellulose material.

In some embodiments of the invention, the compositions described above may be included as part of a termite station. Suitable stations may have been described in the art and may include, for example, those described in U.S. Pat. No. 6,928,771. Such station may include a housing that includes at least a portion which is transparent or translucent. In some embodiments, a bag, as described above, that includes at least the material and a cellulose material, may be placed in the housing. The housing includes at least one opening suitable for ingress or egress of a termite. In embodiments of the invention, the opening may be created by the user, be part of the housing, or it may include a portion that comprises a termite-edible or termite-displaceable coating or material in which termites may create the opening for ingress and egress. Suitable termite displaceable coatings or materials may comprise various polymers, for example, polyurethane, polystyrene, or polyisocyanurate.

In further embodiments of the invention, the station may further include a cover that blocks at least a portion of light from entering the housing. In some embodiments, the cover may extend over the housing to provide shading to the materials and/or compositions of the present invention. In such embodiments, the shifts in temperatures provided by the shading (keeping the material cooler when there is excess sun, or providing heat in a relatively cold environment) may make the materials and/or composition of the present invention more desirable to termites. In further embodiments, a weighted material for holding the housing in place and applying a downward pressure to the materials and/or compositions of the present invention may be used. Such weighted material may be placed on top of the housing and may be removed before inspecting to determine termite activity.

Alternatively or additionally, the housing may include a sensor to detect termite presence. The sensor may be embedded in a displaceable coating or in a *Sabal* palm material, or it can be embedded in a composite bait material that includes both displaceable material and edible *Sabal* palm material. Compositions described above as part of the present invention may be placed within the housing. For example, such compositions, as described, may include materials from the *Sabal* palm tree, pesticides, adjuvants and other additives. In further embodiments, the station may have a portion that is below-ground. Such below-ground section may include a housing, bait material, including those compositions described above, tubes and others.

As indicated above, the present invention may also include an assurance program for monitoring and limiting termite damage to certain structures utilizing the compositions and methods disclosed. Such assurance program may involve a number of steps for the user to perform. For example, the user may visit the structure to determine if any termite activity or damage has been caused to the structure. This step may also include evaluating the likelihood of termite activity based upon termites in the area, the geography of the structure location, the types of materials utilized for the construction of the structure, wood or other materials that may be in proximity to the structure, and others.

The assurance program associated with the present invention may also include placing a termite station, as described above, in an area proximate the structure. For example, the termite station may be placed within about 4 meters of the structure, or within about 3 meters, or within about 2 meters of the structure, or closer. The user's specification may dictate the distance the station is placed in relation to the structure.

In embodiments of the invention, the assurance program may also include the step of inspecting the termite station for termites at a time after the station is placed. For example, the termite station may be inspected less than once a year, once a year, twice a year, three times a year, four times a year, five times a year, six times a year, or more. The interval at which the station is inspected may be based on the geography where the structure is located, on events that take place regarding additional termite activity, or others.

If termites or evidence of previous termite activity (such as food consumption or tunnelling in the resource) are observed, the user may remove the living or dead termites with the use of a pesticide, such as an insecticide or termiticide, or other method. In other embodiments, if termites are observed, the user may decide to provide termite treatments to the structure. For example, suitable termite treatments may include a termiticide or insecticide "wrap" (perimeter treatment), spot or localized treatment(s) with termiticides or insecticides; utilizing baits with certain insecticide or termiticides; trench treatments, vertical treatments, or others. The particular treatment regimen may be based on the severity and location(s) of the termite activity.

In some embodiments, the present invention is directed to a kit that includes materials or compositions of the present invention that are free of pesticides and also compositions of the present invention that do include pesticides. The kit may be utilized to apply the pesticide-free material and/or composition first, to determine termite activity, and then the use of the pesticide-included compositions if termites are present.

As indicated above, the compositions and methods of the present invention described above, may be utilized to avoid or reduce damage to buildings, homes, and other structures by alerting to proximate termite activity. However, with the compositions according to the invention it is also possible to avoid or reduce damage caused to plants by cellulose-eating pests, especially to control pests of the said kind on commodity plants and ornamentals in agriculture, in horticulture and in forestry, or on parts of such plants, such as the wood, fruit, blossom, leaves, seeds, stems, tubers or roots, while in some cases parts of the plants that grow later are also still protected against those pests. Suitable target crops in the context of controlling the said wood pests include especially cereals (grains and grasses) such as wheat, barley, rye, oats, rice, maize, sorghum, and millet, root crops such as manioc and beet, such as sugar beet and fodder beet; fruit, such as pomes, stone fruit and soft fruit, such as apples, avocados, mangoes, pears, plums, peaches, almonds, cherries, or berries, for example strawberries, raspberries and blackberries; leguminous plants, such as beans, lentils, peas and soybeans; oil plants, such as rape, mustard, poppy, olives, sunflowers, coconut, castor oil plants, cocoa beans and groundnuts; Cucurbitaceae, such as marrows, cucumbers and melons; fibre plants, such as cotton, flax, hemp and jute; citrus fruit, such as oranges, lemons, limes, grapefruit and mandarins; vegetables, such as spinach, lettuce, asparagus, cabbages, carrots, onions, tomatoes, potatoes and paprika; Lauraceae, such as avocados, cinnamon and camphor; and tobacco, nuts, coffee, aubergines, sugar cane, tea, pepper, vines, hops, bananas, natural rubber plants, eucalyptus, as well as ornamentals, including ornamental grasses.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Example 1

Termites of various species were placed into a 3.25" diameter transparent plastic Petri plate along with various pre-moistened substrates described by treatment. The termites thus had tightly localized choice of substrates to feed upon and/or occupy. The numbers at each time assessment in the data tables indicate the number of termites on or under various substrate options (sand or foods) as well as the number of termites standing or walking elsewhere in the Petri plate. Various forms of the *Sabal* palm were tested, including sawdust, slabs, chunks, and chipped in a mulcher. Pine, either aged indoors or weathered outdoors, was used as a standard comparison due to its common use as structural timber. The different treatments refer to each individual time the items were tested.

TABLE 1

Termites Tested: *Reticulitermes virginicus* from Maryland; 30 workers, 0 Soldiers

| Treatment | Substrate/Location of Termites | 15 min | 1 hr | 3 hrs | 6 hrs | 9 hrs | 18 hrs | 24 hrs |
|---|---|---|---|---|---|---|---|---|
| 1 | On or under sand | 0 | 0 | 0 | 0 | 0 | 6 | 6 |
|   | On or under chipped Sabal palm | 25 | 27 | 30 | 30 | 30 | 24 | 24 |
|   | Standing or walking, not in contact with Sabal palm | 5 | 3 | 0 | 0 | 0 | 0 | 0 |
| 2 | On or under sand | 0 | 0 | 0 | 0 | 0 | 0 | 1 |
|   | On or under chipped Sabal palm | 30 | 30 | 30 | 30 | 29 | 26 | 22 |
|   | On or under indoor aged Pine | 0 | 0 | 0 | 0 | 1 | 4 | 7 |
|   | Standing or walking, not in contact with either | 0 | 0 | 0 | 0 | 0 | 1 | 1 |
| 3 | On or under sand | 2 | 1 | 0 | 0 | 0 | 3 | 0 |
|   | On or under chipped Sabal palm | 19 | 24 | 28 | 28 | 26 | 23 | 28 |
|   | On or under outdoor aged Pine | 9 | 6 | 2 | 2 | 4 | 3 | 2 |
|   | Standing or walking, not in contact with either | 0 | 0 | 0 | 0 | 0 | 1 | 0 |

TABLE 2

Termites Tested: *Coptotermes formosanus* from Florida; 28 workers, 2 Soldiers

| Treatment | Substrate/Location of Termites | 15 min | 1 hr | 2 hrs | 4 hrs | 16 hrs | 24 hrs | 48 hrs |
|---|---|---|---|---|---|---|---|---|
| 1 | On or under sand | 2 | 3 | 0 | 1 | 3 | 2 | 2 |
|   | On or under Sabal palm chunks | 25 | 26 | 28 | 19 | 19 | 16 | 18 |
|   | On or under indoor aged Pine chunks | 0 | 0 | 0 | 1 | 4 | 7 | 3 |
|   | Standing or walking, not in contact with either | 3 | 1 | 2 | 9 | 4 | 5 | 7 |
| 2 | On or under sand | 1 | 1 | 0 | 2 | 1 | 1 | 0 |
|   | On or under Sabal palm slab on soil | 29 | 26 | 23 | 24 | 10 | 18 | 19 |
|   | On or under indoor aged Pine, slab on soil | 0 | 0 | 4 | 3 | 3 | 5 | 9 |
|   | Standing or walking, not in contact with either | 0 | 3 | 3 | 1 | 16 | 6 | 2 |
| 3 | On or under sand | 2 | 1 | 0 | 0 | 0 | 3 | 0 |
|   | On or under Sabal palm sawdust, stored 7 months | 19 | 24 | 28 | 28 | 26 | 23 | 28 |

TABLE 2-continued

Termites Tested: *Coptotermes formosanus* from Florida; 28 workers, 2 Soldiers

| Treatment | Substrate/Location of Termites | 15 min | 1 hr | 2 hrs | 4 hrs | 16 hrs | 24 hrs | 48 hrs |
|---|---|---|---|---|---|---|---|---|
| | On or under indoor aged Pine, sawdust | 9 | 6 | 2 | 2 | 4 | 3 | 2 |
| | Standing or walking, not in contact with either | 0 | 0 | 0 | 0 | 0 | 1 | 0 |

TABLE 3

Termites Tested: *Reticulitermes flavipes* from Maryland; 50 Total Termites

| Treatment | Substrate/Location of Termites | 10 min | 10.5 hr | 24 hrs | 38.5 hrs |
|---|---|---|---|---|---|
| 1 | On or under indoor aged Pine, chunk | 2 | 0 | 0 | Not recorded (NR) |
| | On or under decayed White Birch, chunk | 3 | 2 | 1 | NR |
| | On or under blended Sabal palm | 22 | 22 | 26 | NR |
| | On or under Sabal palm slab, chunk | 1 | 1 | 0 | NR |
| | Standing or walking, not in contact with any | 22 | 25 | 23 | NR |
| 2 | On or under sand | 14 | 14 | 5 | 1 |
| | On or under decayed White Birch, sawdust | 1 | 0 | 0 | 0 |
| | On or under Sabal Palm, sawdust | 6 | 19 | 45 | 49 |
| | Standing or walking, not in contact with either | 29 | 17 | 0 | 0 |

TABLE 4

Termites Tested: *Reticulitermes flavipes* from Florida; 35 Total Termites in Treatment 1; 37 in Treatment 2

| Treatment | Substrate/Location of Termites | 15 min | 1 hr | 3 hrs | 15 hrs | 24 hrs | 48 hrs |
|---|---|---|---|---|---|---|---|
| 1 | On or under sand | 2 | 0 | 0 | 0 | 0 | 1 |
| | On or under blended Sabal palm | 19 | 8 | 5 | 18 | 20 | 16 |
| | On or under indoor aged Pine, sawdust | 1 | 1 | 0 | 1 | 2 | 4 |
| | Standing or walking, not in contact with any | 13 | 26 | 30 | 16 | 13 | 14 |
| 2 | On or under sand | 0 | 1 | 0 | 1 | 0 | 0 |
| | On or under blended Sabal palm | 6 | 8 | 7 | 25 | 23 | 33 |
| | On or under indoor aged Pine, sawdust | 0 | 0 | 0 | 0 | 2 | 0 |
| | Standing or walking, not in contact with either | 31 | 28 | 30 | 9 | 12 | 4 |

TABLE 5

Termites Tested: *Reticulitermes flavipes* from Florida; 35 Total Termites in Treatment 1; 37 in Treatment 2

| Treatment | Substrate/Location of Termites | 15 min | 1 hr | 3 hrs | 15 hrs | 24 hrs | 48 hrs |
|---|---|---|---|---|---|---|---|
| 1 | On or under sand | 2 | 0 | 0 | 0 | 0 | 1 |
| | On or under blended Sabal palm | 19 | 8 | 5 | 18 | 20 | 16 |
| | On or under indoor aged Pine, sawdust | 1 | 1 | 0 | 1 | 2 | 4 |
| | Standing or walking, not in contact with any | 13 | 26 | 30 | 16 | 13 | 14 |
| 2 | On or under sand | 0 | 1 | 0 | 1 | 0 | 0 |
| | On or under blended Sabal palm | 6 | 8 | 7 | 25 | 23 | 33 |
| | On or under indoor aged Pine, sawdust | 0 | 0 | 0 | 0 | 2 | 0 |
| | Standing or walking, not in contact with either | 31 | 28 | 30 | 9 | 12 | 4 |

TABLE 6

Termites Tested: *Reticulitermes flavipes* from Texas; 24 Total Termites

| Treatment | Substrate/Location of Termites | 15 min | 1 hr | 3 hrs | 16 hrs | 19 hrs | 21 hrs | 24 hrs |
|---|---|---|---|---|---|---|---|---|
| | On or under outdoor weathered Pine, sawdust | 0 | 0 | 0 | 2 | 0 | 0 | 1 |
| | On or under Sabal palm, sawdust | 0 | 3 | 2 | 3 | 20 | 8 | 14 |
| | Standing or walking, not in contact with any | 24 | 21 | 22 | 19 | 4 | 16 | 9 |

TABLE 7

Termites Tested: *Reticulitermes flavipes* from Georgia; 15 Total Termites

| Treatment | Substrate/Location of Termites | 15 min | 1 hr | 3 hrs | 9 hrs | 23 hrs |
|---|---|---|---|---|---|---|
| 1 | On or under sand | 0 | 1 | 1 | 0 | 0 |
|   | On or under outdoor weathered Pine, chunks | 0 | 1 | 1 | 1 | 1 |
|   | On or under Sabal palm, chipped | 10 | 5 | 9 | 4 | 3 |
|   | Standing or walking, not in contact with any | 5 | 8 | 4 | 10 | 11 |
| 2 | On or under sand | 5 | 2 | 0 | 0 | 2 |
|   | On or under Pine Stake aged indoors, sawdust and chunks | 0 | 1 | 0 | 0 | 1 |
|   | On or under indoor Sabal palm, chipped | 9 | 12 | 15 | 13 | 7 |
|   | Standing or walking, not in contact with either | 1 | 0 | 0 | 2 | 5 |

Example 2

Bioassay tubes were loaded with 0.2 g of finely ground *Sabal* palm materials into microtubes. One mL of dilute active ingredient (described below) was applied to the tube and fully absorbed by the palm materials. The tubes were placed in petri dishes on a 3 mm sand base. Thirty to forty workers and soldiers from the field-collected *Reticulitermes* and *Coptotermes* colonies were introduced to the petri dishes. Termite activity was evaluated on a 0-4 scale, with 0 denoting death and 4 indicating normal behaviour. Mortality was recorded weekly for up to 9 weeks, depending on survivorship.

TABLE 8

*Coptotermes formosanus*

| | | | % MORT 5 DA-A | % MORT 7 DA-A | % MORT 12 DA-A | % MORT 20 DA-A | % MORT 28 DA-A | % MORT 42 DA-A |
|---|---|---|---|---|---|---|---|---|
| 1 | Check |  | 0 a | 0 b | 6.65 bc | 11.3 c | 13.8 b | 25 |
| 2 | Indoxacarb | 7.5 ppmai | 0 a | 0 b | 0 c | 2.5 c | 5 c | 90 |
| 3 | Indoxacarb | 75 ppmai | 0.013 a | 0.038 a | 11.68 ab | 35 b | 93.8 a | 100 |
| 4 | Indoxacarb | 150 ppmai | 0 a | 0.013 ab | 17.48 a | 37.5 b | 98.8 a | 100 |
| 5 | Indoxacarb | 300 ppmai | 0 a | 0 b | 17.5 a | 93.8 a | 100 a | 100 |

TABLE 9

*Reticulitermes flavipes*

| | | | % MORT 3 DA-A | % MORT 5 DA-A | % MORT 10 DA-A |
|---|---|---|---|---|---|
| 1 | Check |  | 0.54 d | 0.83 c | 9.45 b |
| 2 | Indoxacarb | 7.5 ppmai | 9.66 c | 56.71 b | 99.79 a |
| 3 | Indoxacarb | 75 ppmai | 16.59 bc | 87.91 a | 100 a |
| 4 | Indoxacarb | 150 ppmai | 22.94 b | 87.84 a | 100 a |
| 5 | Indoxacarb | 300 ppmai | 47.09 a | 98.42 a | 100 a |

TABLE 10

*Coptotermes formosanus* and *Reticulitermes flavipes*

| | | | % Mortality 4 DA-A | % Mortality 7 DA-A | % Mortality 11 DA-A | % Mortality 18 DA-A | % Mortality 25 DA-A |
|---|---|---|---|---|---|---|---|
| *Coptotermes formosanus* | | | | | | | |
| 1 | Check Untreated |  | 2.5 a | 3.75 a | 7.5 a | 76.25 a | 77.5 a |
| 2 | Lufenuron | 0.15 % v/v | 4.38 a | 7.5 a | 14.38 a | 21.25 a | 45 a |
| *Reticulitermes flavipes* | | | | | | | |
| 1 | Check Untreated |  | 1.88 a | 2.5 a | 2.5 a | 2.5 a | 6.25 a |
| 2 | Lufenuron | 0.15 % v/v | 11.25 a | 50 a | 51.25 a | 51.25 a | 51.88 a |

TABLE 10-continued

*Coptotermes formosanus* and *Reticulitermes flavipes*

|  |  |  | % Mortality 32 DA-A | % Mortality 41 DA-A | % Mortality 53 DA-A | % Mortality 63 DA-A |
|---|---|---|---|---|---|---|
| *Coptotermes formosanus* | | | | | | |
| 1 | Check Untreated | | 100 a | 100 a | | |
| 2 | Lufenuron | 0.15 % v/v | 93.8 a | 100 a | | |
| *Reticulitermes flavipes* | | | | | | |
| 1 | Check Untreated | | 7.5 a | 8.13 a | 13.13 b | 18.75 b |
| 2 | Lufenuron | 0.15 % v/v | 68.75 a | 70.63 a | 86.25 a | 96.25 a |

TABLE 11

*Coptotermes formosanus*

|  |  | % MORT 5 DA-A | % MORT 11 DA-A | % MORT 19 DA-A | % MORT 37 DA-A |
|---|---|---|---|---|---|
| Check | | 0 d | 0 c | 0 c | 0 c |
| Cyantraniliprole | 5 ppmai | 0.5 cd | 1.2 b | 1.2 b | 1.2 b |
| Cyantraniliprole | 50 ppmai | 3.9 c | 100 a | 100 a | 100 a |
| Cyantraniliprole | 100 ppmai | 49.3 b | 100 a | 100 a | 100 a |
| Cyantraniliprole | 200 ppmai | 80.1 a | 100 a | 100 a | 100 a |

TABLE 12

*Coptotermes formosanus*

|  |  | TUNNEL LENGTH CM 2 DA-A | INSECT ACTIVIIS 0-4 2 DA-A | INSECT % MORTAL 7 DA-A | INSECT ACTIVIIS 0-4 7 DA-A | INSECT % MORTAL 9 DA-A | INSECT % MORTAL 20 DA-A | INSECT ACTIVIIS 0-4 20 DA-A |
|---|---|---|---|---|---|---|---|---|
| 1 Check Baited | | 4 a | 4 a | 0 c | 4 a | 0 c | 1.7 c | 4 |
| 2 Chlorantraniliprole | 100 ppmai | 1.5 b | 1 c | 60.5 a | 1 c | 98.3 a | 100 a | 0 |
| 3 Chlorantraniliprole | 50 ppmai | 1 b | 1.5 c | 23.2 b | 1 c | 90.8 b | 100 a | 0 |
| 4 Chlorantraniliprole | 10 ppmai | 4 a | 4 a | 1.3 c | 3.3 b | 1.5 c | 91.1 b | 0.8 |
| 5 Chlorantraniliprole | 1 ppmai | 4 a | 3.3 b | 5.4 c | 3.8 ab | 2.3 c | 93.4 ab | 0.5 |

TABLE 13

*Reticulitermes flavipes*

|  |  | TUNNEL LENGTH CM 2 DA-A | INSECT ACTIVIIS 0-4 2 DA-A | INSECT % MORTAL 7 DA-A | INSECT ACTIVIIS 0-4 7 DA-A | INSECT % MORTAL 9 DA-A | INSECT % MORTAL 20 DA-A | INSECT ACTIVIIS 0-4 20 DA-A |
|---|---|---|---|---|---|---|---|---|
| 1 Check Baited | | 4 a | 4 a | 0 b | 4 a | 0 c | 0 c | 4 |
| 2 Chlorantraniliprole | 100 ppmai | 1 a | 1.3 d | 15 a | 1 a | 100 a | 100 a | 0 |
| 3 Chlorantraniliprole | 50 ppmai | 2 a | 2.3 c | 13 a | 2 a | 94.7 a | 100 a | 0 |
| 4 Chlorantraniliprole | 10 ppmai | 4 a | 3.3 b | 0.2 b | 4 a | 0.5 c | 4.92 b | 4 |
| 5 Chlorantraniliprole | 1 ppmai | 4 a | 4 a | 0.8 b | 4 a | 2.4 b | 4.1 b | 4 |

The invention claimed is:

1. A termite preferred resource composition comprising:
   a. One or more materials from a palm tree species within the genus *Sabal* wherein the stalk (inflorescence rachis and attached branches, bracts, and floral/fruit structures) or the petiole, or a mixture thereof of the palm tree species is utilized;
   b. An insecticide selected from indoxacarb, acetamiprid, bifenthrin, chlorantraniliprole, cyantraniliprole, chlorfenapyr, cypermethrin, esfenvalerate, fipronil, imidacloprid, permethrin, diflubenzuron, hexaflumuron, hydamethylnon, lufenuron, noviflumuron, novaluron, fluzauron, chlorfluazuron, triflumuron, thiamethoxam, or mixtures thereof.

2. The composition of claim 1, wherein the composition further comprises adjuvants, solvents, carrier, surfactants, or extenders.

3. The composition of claim 1, wherein the composition further comprises termite pheromones.

4. The composition of claim 1, wherein the insecticide is indoxacarb or chlorantraniliprole.

5. The composition of claim 1, wherein the portions of the palm tree species are utilized in a sawdust or chipped form.

6. The composition of claim 1, wherein the materials from the palm tree species include portions, extracts, isolates, derivatives or combinations thereof.

* * * * *